US010652779B2

(12) United States Patent
Maeder et al.

(10) Patent No.: US 10,652,779 B2
(45) Date of Patent: May 12, 2020

(54) METHOD FOR PROVIDING CONGESTION INFORMATION IN A NETWORK

(71) Applicant: NEC Europe Ltd., Heidelberg (DE)

(72) Inventors: Andreas Maeder, Wuerzburg (DE); Faqir Zarrar Yousaf, Leimen (DE)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/574,172

(22) PCT Filed: May 26, 2015

(86) PCT No.: PCT/EP2015/061575
§ 371 (c)(1),
(2) Date: Nov. 15, 2017

(87) PCT Pub. No.: WO2016/188565
PCT Pub. Date: Dec. 1, 2016

(65) Prior Publication Data
US 2018/0132130 A1 May 10, 2018

(51) Int. Cl.
H04L 12/26 (2006.01)
H04W 28/02 (2009.01)
(Continued)

(52) U.S. Cl.
CPC ....... H04W 28/0289 (2013.01); H04L 43/062 (2013.01); H04L 43/067 (2013.01);
(Continued)

(58) Field of Classification Search
CPC .......... H04W 28/0289; H04W 28/0284; H04L 47/28; H04L 47/2416; H04L 43/062; H04L 43/067; H04L 47/11
(Continued)

(56) References Cited

U.S. PATENT DOCUMENTS

2009/0037999 A1* 2/2009 Anderson ............. H04W 28/16 726/12
2010/0265833 A1* 10/2010 Ou ......................... H04L 69/28 370/252

(Continued)

FOREIGN PATENT DOCUMENTS

EP 2365665 A1 9/2011
EP 2706703 A2 3/2014
EP 2784991 A1 10/2014

OTHER PUBLICATIONS

3GPP TS 36.314 V12.0.0 (Sep. 2014); 3$^{rd}$ Generation Partnership Project; Technical Specification Group Radio Access Networks; Evolved Universal Terrestrial Radio Access (E-UTRA); Layer 2-Measurements (Release 12), Sep. 2014, pp. 1-20.

(Continued)

Primary Examiner — Mang Hang Yeung
(74) Attorney, Agent, or Firm — Leydig, Voit & Mayer, Ltd.

(57) ABSTRACT

A method for providing congestion information in a network is performed in a memory available to a computing entity. A traffic demand is obtained within a certain part of the network by evaluating an amount of traffic in the part of the network per time. A congestion value representing a congestion level of a bottleneck connection link in the network is calculated. The congestion value is a scalar and calculated based on a comparison between measured and/or estimated traffic and traffic demand within a certain part of said network.

19 Claims, 8 Drawing Sheets

(51) Int. Cl.
*H04L 12/801* (2013.01)
*H04L 12/853* (2013.01)
*H04L 12/841* (2013.01)

(52) U.S. Cl.
CPC .......... *H04L 47/11* (2013.01); *H04L 47/2416* (2013.01); *H04L 47/28* (2013.01); *H04W 28/0284* (2013.01)

(58) Field of Classification Search
USPC .................................................. 370/135, 235
See application file for complete search history.

(56) References Cited

U.S. PATENT DOCUMENTS

2010/0309781 A1* 12/2010 Wang ................... H04B 7/0871
370/229
2012/0020221 A1* 1/2012 Bugenhagen ....... H04L 43/0888
370/235
2012/0163203 A1* 6/2012 Wilkinson .......... H04L 41/5025
370/252
2013/0322242 A1* 12/2013 Swenson ................. H04L 47/11
370/232

OTHER PUBLICATIONS

3GPP TR 23.705 V13.0.0 (Dec. 2014); 3$^{rd}$ Generation Partnership Project; Technical Specification Group Services and System Aspects; Study on system enhancements for user plane congestion management (Release 13), Dec. 2014, pp. 1-61.

3GPP TS 23.401 V13.2.0 (Mar. 2015); 3$^{rd}$ Generation Partnership Project; Technical Specification Group Services and System Aspects; General Packet Radio Service (GPRS) enhancements for Evolved Universal Terrestrial Radio Access Network (E-UTRAN) access (Release 13), Mar. 2015, pp. 1-313.

* cited by examiner

```
input in_min_active_bearers       // minimum number of active bearers per cell id (e.g. 20)
input in_min_queue_length         // minimum queue length (e.g. 100Kbyte)
input in_min_bandwidth_demand     // minimum bandwidth demand per bearer (e.g. 200kbps)
input in_max_congestion_level     // maximum congestion level (set 1 for cong_level in (0, 1}
input in_min_overshoot_factor     // defines how far the demand must exceed the throughput to
                                  //   reach the minimum congestion level (which is 1)
input in_max_overshoot_factor     // maximum overshoot factor; if value is exceeded, the
                                  //   maximum congestion level is assumed alpha := (in_max_congestion_level-1)/(in_max_overshoot_factor-in_min_overshoot_factor)
for each cell_id in cell_id_list               // obtain cell_id_list from data base first
    // get the a list of active bearers per cell id
    list active_bearers     := get_active_bearers (cell_id)
    integer congestion_level := 0              // initialize with zero
    double cell_throughput   := 0
    double cell_demand       := 0 if number of active_bearers >= in_min_active_bearers
        for each bearer in active_bearers
            integer queue_length := (← get or estimate the queue length for this bearer)
            if queue_length >= in_min_queue_length
                cell_throughput := cell_throughput + (← get measured throughput for
                                                          the current bearer)
                cell_demand := cell_demand + in_min_bandwidth_demand
            end if
        end for each
        if cell_throughput > 0 and cell_demand/cell_throughput > in_min_overshoot_factor
            congestion_level := min(alpha*cell_demand/cell_throughput+(1-
                                    alpha*in_min_overshoot_factor), in_max_congestion_level)
        end if
    end if
end for each
```

Fig. 5

METHOD FOR PROVIDING CONGESTION INFORMATION IN A NETWORK

CROSS-REFERENCE TO PRIOR APPLICATION

This application is a U.S. National Stage Application under 35 U.S.C. § 371 of International Application No. PCT/EP2015/061575 filed on May 26, 2015. The International Application was published in English on Dec. 1, 2016 as WO 2016/188565 A1 under PCT Article 21(2).

FIELD

The present invention relates to a method for providing congestion information in a network like a radio access network or the like.

The present invention further relates to a system for providing congestion information in a network like a radio access network or the like.

BACKGROUND

Today network operators are faced with an exponential increase in traffic demand. To cope with this network operators are increasingly trying to upgrade their network capacities to satisfy these demands.

When the user traffic demand exceeds the network capacity of a radio access network RAN it leads to congestion in the whole network. Congestion in radio access networks is nowadays one of the most important challenges currently being faced by network operators. Conventionally in 3GPP various mechanisms are devised to report congestion from the radio access network to the core network, e.g. disclosed in the non-patent literature 3GPP, "TR 23.705, System Enhancements for User Plane Congestion Management" so that the core network can take mitigating actions such as applications specific traffic limiting, consider subscriber profiles and operator policies for overcoming congestion into account.

FIG. 1 shows a conventional mobile network comprising a user equipment UE connected to a radio access network RAN which is further connected to a core network in the user plane and control plane. The core network is further connected to IP services and the Internet. Reference sign 1 in FIG. 1 indicates that the radio access network RAN should be able to detect congestion in an unambiguous manner. The radio access network RAN may then indicate the congestion 2 to the core network. The core network then may initiate core network-based congestion mitigation 4 and provide service and/or quality of service information for radio access network-based congestion mitigation to the radio access network RAN. The radio access network RAN then provides radio access network based congestion mitigation which is indicated with reference sign 5b. These actions 1-5b may be involved between the radio access network and the core network for congestion detection, reporting by using control plane/user plane interfaces or using off-path methods and mitigation actions are done at the core network to alleviate congestion.

In the non-patent literature of 3GPP, "TS 36.314, Evolved Universal Terrestrial Radio Access (E-UTRA); Layer 2—Measurements" various metrics have been defined to measure different parameters in base stations of the radio access network like an evolved nodeB or the like. Most of these parameters when used in isolation cannot give any indication of congestions, since they could exceed some pre-configured thresholds under non-congested situations as well. For example the physical resource block PRB utilization in the radio access network the following measurement is defined $$M(T) = \left\lfloor \frac{M1(T)}{P(T)} * 100 \right\rfloor \quad (1)$$

However this measurement in isolation does not indicate a congestion since 100% physical resource block utilization could also indicate several user equipment UE in bad radio conditions, or depending on modulation and coding scheme selection/scheduling strategies, the physical resource block PRB utilization can be maximized even when the radio access network is not congested. Similar problems exist with other currently defined measurements such as scheduled IP throughput, data loss, the number of active user equipment or the like.

SUMMARY

In an embodiment, the present invention provides a method for providing congestion information in a network which is performed in a memory available to a computing entity. A traffic demand is obtained within a certain part of the network by evaluating an amount of traffic in the part of the network per time. A congestion value representing a congestion level of a bottleneck connection link in the network is calculated. The congestion value is a scalar and calculated based on a comparison between measured and/or estimated traffic and traffic demand within a certain part of said network.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 5 shows a realization of part of a method according to a further embodiment of the invention;

DETAILED DESCRIPTION

Figure 1:
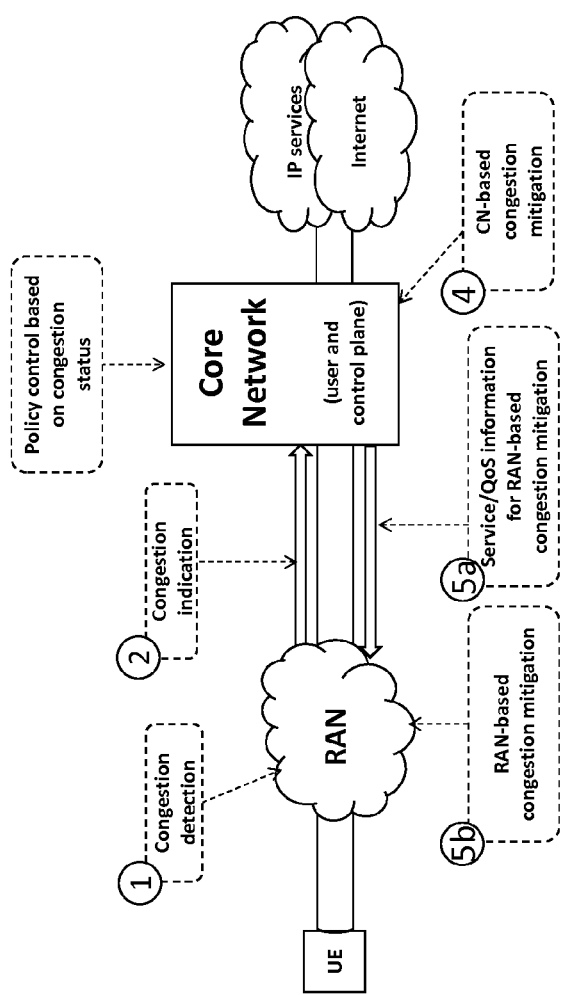
FIG. 1 shows a conventional mobile network.

To overcome the problems discussed above, a combination of measurements currently defined to detect congestion may be used. However, the inventors have recognized that this may lead to an under-utilization of radio access network resources by means of overcompensating actions undertaken for instance at the core network. Reusing current measurements in their present state has also the drawback that congestion detection depends entirely on the current traffic characteristics rather than on future traffic demand. This may lead to inaccuracy due to the varying nature of instantaneous traffic patterns and dependence on medium- to long-term congestion situations for reporting. Thus, reuse of measurements is challenging and inaccurate in some cases.

An aspect of the invention provides congestion information capturing medium- to long-term congestion and not short-traffic bursts. A further aspect provides a meaningful capture of the congestion level information enabling appropriate congestion mitigation measures, for example according to the severeness of the congestion. A further aspect provides congestion information enabling a differentiation between congestion scenarios and low connection performance scenarios, for example per-bearer throughput based on external factors like bad radio conditions or the like. An even further aspect provides congestion information which can be easily and flexibly configured.

At least one embodiment provides a method for providing congestion information in a network like a radio access network or the like, performed in a memory available to a computing entity, wherein a congestion value representing the congestion level of a bottleneck connection link in the network is calculated, wherein said congestion value is a scalar and calculated based on a comparison between measured and/or estimated traffic and traffic demand within a certain part of said network, wherein said traffic demand is obtained by evaluating the amount of traffic in said part per time.

At least one embodiment provides a system for providing congestion information in a network like a radio access network or the like, wherein a congestion value representing the congestion level of a bottleneck link in the network is calculated by a computing entity, wherein said congestion value is a scalar and calculated based on a comparison between measured and/or estimated traffic and traffic demand within a certain part of said network, wherein said traffic demand is obtained by evaluating the amount of traffic in said part per time.

At least one embodiment enables network operators to obtain a normalized view of congestion status in their network. At least one embodiment enables effective counter measures like prioritization of the traffic or the like.

At least one embodiment enhances the flexibility since the congestion level can be applied or limited to various parts of the network.

At least one embodiment has the advantage that the congestion value captures medium to long-term congestion and not short-term traffic bursts.

At least one embodiment has the advantage of capturing of congestion levels in such a way that congestion mitigation measures can be reliably performed. Further said congestion value is easily configurable for example by operators. Even further said congestion value enables a differentiation between congestion scenarios and low connection performance scenarios.

In other words at least one embodiment enables a scalar value representing a congestion level of a bottleneck link, for example of a radio cell in a mobile network is calculated. The calculation considers e.g. an estimated minimum bandwidth demand compared to the actual measured or estimated throughput as basic metric for congestion.

The term "part" in connection with the term "network" is to be understood in a broad sense, meaning that part of the network can be any real or imaginary fraction, portion or component of the network. A part can be for instance a group of network entities, links, or the like.

Further features, advantages and embodiments are described or may become apparent in the following:

Said part of the network may be at least one of the following: a cell, a link, a radio bearer, a handset, a connection. This enhances flexibility since the congestion level can be defined or applied to various levels or parts of a network to indicate the congestion only in said part or fraction.

Said traffic demand may be represented by a minimum bandwidth demand. Said minimum demand may either be estimated or determined based on prior measurements. This enables to provide a minimum traffic demand for a connection or the like to ensure connectivity.

A congestion may be detected based on said congestion value when said minimum bandwidth demand exceeds the measured traffic per time over a given time span. This enables to reliably detect a congestion: If the minimum bandwidth demand exceeds the actual measured throughput significantly over a certain time span for example it is then detected that a cell is in the state of congestion. If the actual throughput is higher than the minimum bandwidth demand then the cell is regarded to be not in congestion. This enables a reliable detection of congestion.

User equipment information of user equipment in the network and/or connectivity information and/or traffic type information and/or queue level information may be included into the calculation of said congestion value. This enhances the precision and reliability when providing congestion information using the congestion value.

Said congestion value may be adapted via a transformation function, wherein said transformation function amends at least one of the following: a number of congestion levels, a steepness of a congestion level curve, a shape of a congestion level curve. This enhances the flexibility since the congestion value can be adapted for a later evaluation, e.g. by weighing different parameters of said calculation.

Said transformation function may be based on at least one feedback profile configured by an operator. This enhances the flexibility of the congestion value, since different operators can use different transformation functions or profiles such that the congestion level may be based per cell and per link with different feedback profiles depending on the need of an operator.

Said congestion value may be an integer number. When providing the congestion value as an integer number an easy-to-evaluate congestion value is provided.

Said traffic demand may be determined for each service and stored in a table in a database. Said traffic demand may be determined based on the traffic demand peculiar for each type of service and stored in a table in a database. This enables a fast calculation of the congestion value since the minimum bandwidth demand is already determined for each service such that time-consuming measurements for determining traffic demand are avoided.

For determining the traffic the type of the traffic may be identified by at least one of the following: Deep packet inspection, packet markings, quality of service class indicator or the like. This allows a reliable identification of the type of the traffic such that for example when using it with the above mentioned table a fast while reliable determination of the traffic demand depending on a type of the traffic is enabled.

Said traffic demand is computed based on the number of active connections. Active connections may be for example active radio bearers. This avoids that non-active connections are included into the calculation and mislead the congestion level interpretation. The traffic demand can be estimated and/or determined by prior measurements.

A connection may be determined to be active when the amount of time a connection is active within a measurement interval exceeds a predetermined threshold. This enables that during a measurement interval only connections which are longer than certain thresholds are considered as active in the overall calculation. Thus reliability of the congestion information is enhanced.

Said amount of time is either measured directly or estimated. This allows in a flexible way to determine the amount of time a connection is active.

The amount of time may be estimated by counting a number of transmitted packets and/or by a queue activity. This allows in an easy way to estimate the amount of time, i.e. to "indirectly" measure the amount of time.

FIG. 1 shows a conventional mobile network.

In FIG. 1 conventional mechanism evolved in UPCON as disclosed in the non-patent literature 3GPP, "TR 23.705, System Enhancements for User Plane Congestion Management" is shown.

Figure 2:
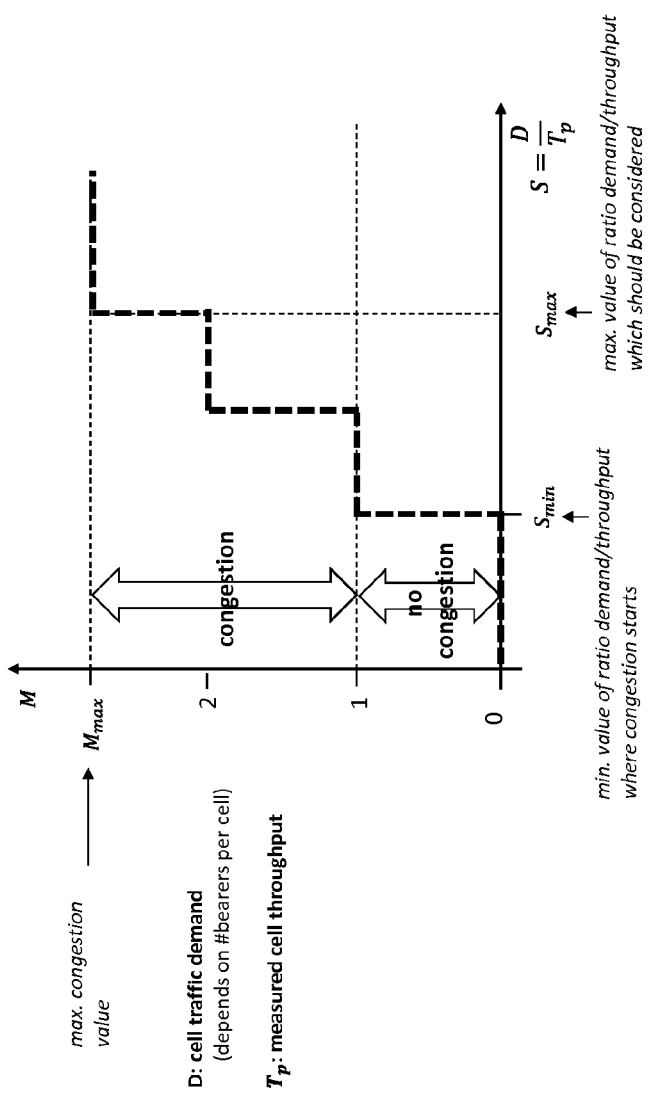
FIG. 2 shows a method according to an embodiment of the invention.

FIG. 2 shows a method according to an embodiment of the invention.

In FIG. 2 a diagram showing congestion value over the ratio of demand versus throughput. In FIG. 2 the congestion level is calculated based on the function comparing the, for example, application-specific bandwidth demand with the actual perceived throughput:

$$M = f\left(\frac{D}{T_p}\right),$$

where D is the estimated bandwidth demand on a shared bottleneck link, for example a radio cell and $T_p$ is the actual measured throughput. As it can be seen in FIG. 2 the congestion value below 1 may be defined or regarded that there is no congestion present whereas congestion values above 1 indicate a congestion up to maximum congestion level $M_{max}$.

Here the estimated bandwidth demand is applied for example for a radio cell. However also the bandwidth demand may be applied for a link, the number of radio bearers, the number of handsets, the number of connections or the like. The calculation may also take into account the number of active user equipment, bearers or connections, the radio conditions of user equipment, the traffic type, for example application type, transport protocol or the like and queue levels as additional input for said calculation. For example the radio condition for user equipment is such that it only can transmit or receive a low throughput, then it may be either not considered or weighted less in the calculation of the congestion level.

Another example is, when looking at transport protocols: For transport protocols which tend to consume as much bandwidth as possible, for example TCP, the queue level on the bottleneck link, for example the radio cell, is considered in the calculation of the congestion level: If the measurement point is not directly on the bottleneck link the queue level can be estimated by measuring the time between arrival of a segment, for example for TCP and the corresponding acknowledgement in the opposite direction.

As mentioned before the estimated per-bearer bandwidth D can depend on the service and/or application type. One possible option to consider this dependence can be to provide a table with mapping of traffic type to bandwidth demand. A possible example of such table is shown below:

| Service | Bandwidth Demand |
|---|---|
| Streaming Video | 1 Mbps |
| Web/http Traffic | 500 kbps |
| . . . | . . . |
| Unknown/Default | 500 kbps |

The service or application information can be deduced based on deep packet inspection (DPI) or based on other techniques such as packet markings or other information (e.g. QoS Class Indicator—QCI in LTE). The default value could also depend on the APN-AMBR as disclosed in the non-patent literature 3GPP, "TS 23.401, General Packet Radio Service (GPRS) enhancements for Evolved Universal Terrestrial Radio Access Network (E-UTRAN) access" defined for the UE as well, taking into account the number of active non-GBR bearers for a user equipment, 'UE' at a particular measurement interval MI, etc. Thus the estimated traffic demand can be calculated by determining the number of distinct service flows for each active non-GBR bearer in each measurement interval MI and by adding the corresponding per-flow bandwidth demand D. The bandwidth demand values could be configured using Operation and Management (OAM) systems as well based on local operator preferences.

The estimated bandwidth demand D may depend on the number of active connections, for example active radio bearers in order to avoid that non-active connections are included in the calculation and mislead the congestion level interpretation. One possible means of considering a connection active may depend on the amount of time a connection is active within a measurement interval. This scenario is depicted in FIG. 3.

Figure 3:
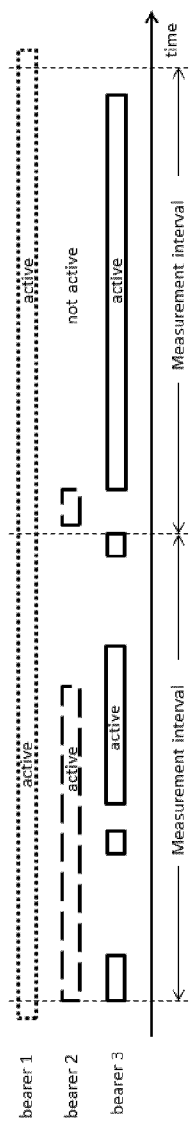
FIG. 3 shows part of a method according to a further embodiment of the invention.

FIG. 3 shows part of a method according to a further embodiment of the invention.

In FIG. 3 during a measurement interval MI only connections which are longer than a certain threshold active are considered as active in the overall calculation. The active time of a connection may be measured directly or can be estimated indirectly, for example based on the number of transmitted data packets or based on the queue activity or the like. As it can be seen in FIG. 3 bearer 1 is always active during both shown measurement intervals MI. Bearer 2 is only considered active in the left/first measurement interval MI and is not active in the right/second measurement interval. Bearer 3 comprises active connections in both measurement intervals MI.

Therefore to summarize bearer 1 and bearer 3 are considered to be active in both measurements intervals MI whereas bearer 2 is only active in the left measurement interval in FIG. 3.

FIG. 4-8 refer in the following to embodiments for LTE radio cells.

Figure 4:
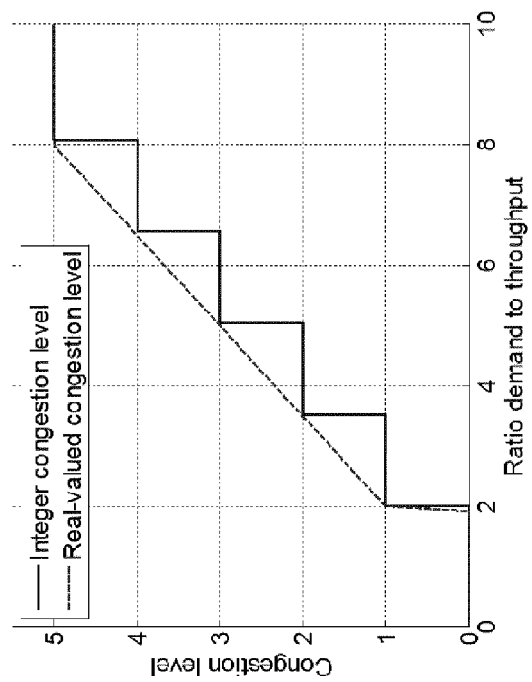
FIG. 4 shows part of a method according to a further embodiment of the invention.

FIG. 4 shows part of a method according to a further embodiment of the invention.

In FIG. 4 an example calculation for a scheduled wireless access such as UTRA or E-UTRA is shown with a scalar congestion being defined as follows:

$$M = \begin{cases} 0; & \text{if } \frac{D}{T_p} < S_{min} \text{ or } T_p = 0 \\ \left\lfloor \alpha \cdot \frac{D}{T_p} + (1 - \alpha \cdot S_{min}) \right\rfloor & \text{if } S_{min} \leq \frac{D}{T_p} < S_{max} \\ M_{max} & \text{if } \frac{D}{T_p} \geq S_{max} \end{cases}$$

where $$\alpha = \frac{M_{max} - 1}{S_{max} - S_{min}}$$

is a scaling factor, $D = \Sigma_{k \in K(cell_{id})} B_{min}(k)$ is the sum of the minimum bandwidth demands $B_{min}(k)$ for all active bearers $k \in K(cell_{id})$ per cell, $T_p = \Sigma_{k \in K(cell_{id})} T_p(k)$ is the corresponding measured throughput, $M_{max}$ is the maximum congestion level, $S_{min}$ is a minimum overshoot factor which describes how much the demand should be over the actual throughput such that congestion starts, and $S_{max}$ is the corresponding maximum overshoot factor which indicates when the highest congestion level is reached.

The per-cell cell throughput depends on the signal interference to noise ration SINR and spatial distribution of the UEs, allocated bandwidth for the evolved node B eNBs, scheduling discipline used, etc. Most eNBs use variants of proportional-fair scheduling, where cell capacity fluctuates depending on time-variant radio conditions and scheduling assignments. Existing measurements such as scheduled IP throughput as disclosed in the non patent literature 3GPP, "TS 36.314, Evolved Universal Terrestrial Radio Access (E-UTRA); Layer 2—Measurements" can be used to enable a standardized meaning of estimating the capacity of a cell for each E-RAN/QCI and on a per-user equipment basis.

In FIG. 4 the following parameters are used for a calculation of the scalar congestion level: $M_{max}=5$, $S_{max}=8$ and $S_{min}=2$. This can be observed from FIG. 4 that the congestion starts if the demand exceeds the throughput by a factor of 2. In total six congestion levels are considered including congestion level 0 with a maximum overshoot factor of 8.

In a further embodiment $M_{max}=1$ a binary congestion level can be configured in the interval (0,1).

FIG. 5 shows a realization of part of a method according to a further embodiment of the invention.

In FIG. 5 the calculation of the congestion value based on input parameters in pseudo code are shown.

Figure 6:
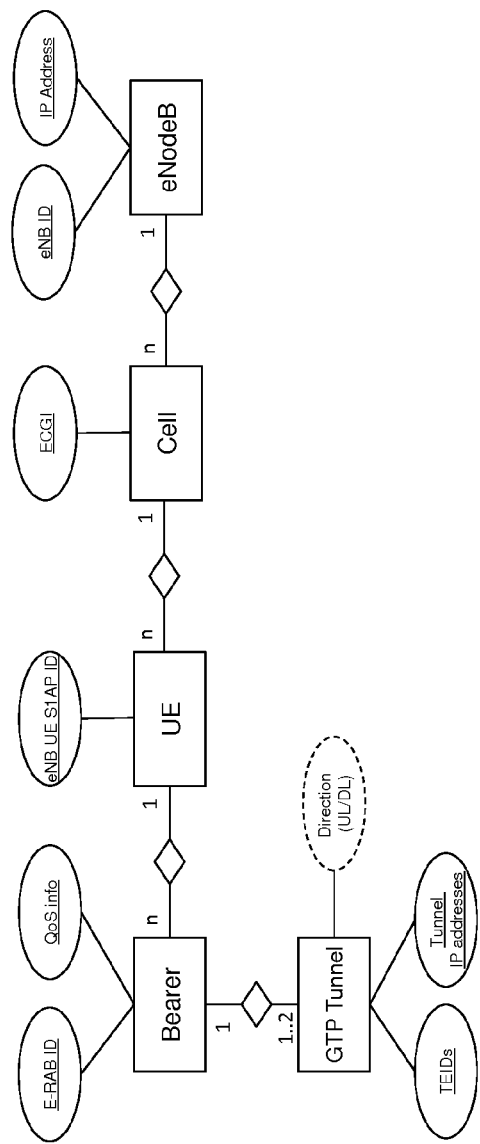
FIG. 6 shows part of a method according to an even further embodiment of the invention.

FIG. 6 shows part of a method according to an even further embodiment of the invention.

In FIG. 6 a relational database model for a value extraction on S1-MME, S1-U logical interfaces in an LTE network are shown. The value extractions or in other words extraction of the information to be available for calculation of the congestion value are shown. To extract the required information, the S1-MME and S1-U logical interfaces in an LTE network are monitored and the following method outlines an example how to extract the specific information:

1. Extract Non-Access Stratum (NAS), hand-over (HO) and context management messages by monitoring the following S1AP messages as shown in the non patent literature of 3GPP, "TS 36.413; S1 Application Protocol (S1AP)":
   INITIAL UE MESSAGE
     Extract ECGI, eNB UE S1AP ID
   UPLINK NAS MESSAGE
     Extract ECGI, eNB UE S1AP ID
   INITIAL CONTEXT SETUP REQUEST
     Extract eNB UE S1AP ID, E-RAB IDs, E-RAB QoS parameters, UL GTP TEIDs at S-GW
   INITIAL CONTEXT SETUP RESPONSE
     Extract eNB UE S1AP ID, E-RAB IDs, E-RAB QoS parameters, DL GTP TEIDs at eNB
   PATH SWITCH REQUEST
     Extract eNB UE S1AP ID, E-RAB IDs, DL Tunnel IP addresses (at target eNodeB), DL TEIDs, ECGI
   PATH SWITCH REQUEST ACKNOWLEDGE
     Extract eNB UE S1AP ID, E-RAB IDs, UL Tunnel IP addresses (at S-GW), UL TEIDs
2. Maintain database with information model as shown in FIG. 6
3. Update ECGI⇔Bearer association in case of
   Network attach
   NAS messages (stateless)
   New bearer setup (stateful)
   Successful hand-over (stateful)
   Context management messages (stateful)
   Bearer tear-down
   Get bearers per cell via relational query for further processing, e.g. as following:
   DL_TEIDS:=SELECT TEID FROM GTP_Tunnels, Bearers, UE WHERE
     GTP_Tunnels.E_RAB_id=Bearers.E_RAB_id AND Bearers.UE_id=UE.UE_id AND UE.ECGI=cell_id AND GTP_Tunnels.direction="downlink"

Figure 7:
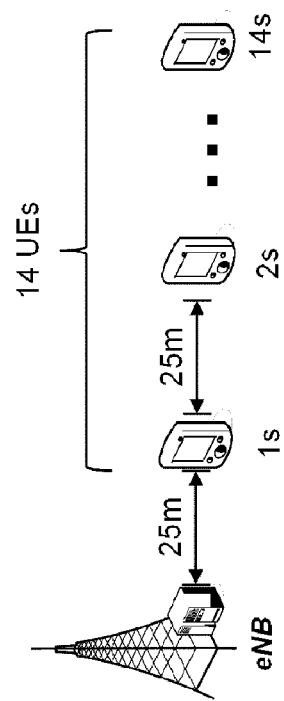
FIG. 7 shows an evaluation scenario for a further embodiment of the invention.

FIG. 7 shows an evaluation scenario for a further embodiment.

In FIG. 7 an evaluation scenario for 14 user equipment and a base station in form of an evolved eNodeB is shown. The objectives are:
  Calibrate congestion detection in RAN node
  Congestion level should increase with number of UEs
  Congestion level with UEs close to eNodeB should be lower than with UEs with higher distance.

To evaluate the congestion user equipment are consecutively added with bulk traffic and quality of service class 0 (default). Each distance of user equipment to the evolved node B is increased for each new user equipment UE and each user equipment UE is becoming active after number of seconds representing the number of user equipment and stays active for 15 s.

Figure 8:
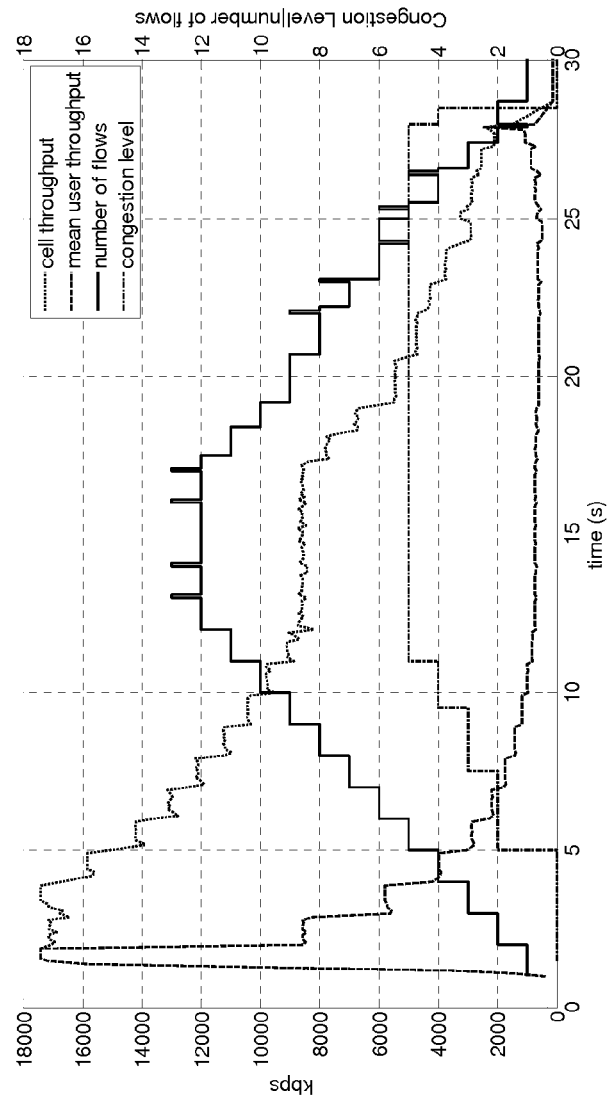
FIG. 8 shows a result of an evaluation according to the evaluation scenario of FIG. 7.

The results are shown in FIG. 8: As it can be seen from FIG. 8 the congestion level is increased with the number active user equipment and the total cell throughput is decreased with the number of user equipment due to larger distance and bad or worse radio conditions.

In summary at least one embodiment of the invention provides a definition of scalar congestion metric which allows for differentiation of the severity and relevance congestion, based on observation and probing of traffic between RAN and core network:
  a. No implementation or modification in radio access network functions are required
  b. Defines different congestion levels
  c. Considers extrinsic factors for low service quality such as radio conditions or traffic bottlenecks on the end-to-end link.
  d. Considers application and service type.

At least one embodiment enables a calculation of metric based on number of active connections to avoid misleading impact of low source traffic intensities.

At least one embodiment provides a method to configure and transform measured metric according to operator requirements, e.g. number of levels, etc.

At least one embodiment provides a method comprising the following steps:

1) Deduce the traffic demand in a cell by observing the signaling traffic of said cell.
2) Deduce congestion levels of a cell by comparing measured traffic throughput with throughput demand.
3) Depending on the congestion level, actions like traffic shaping, media transcoding, or the like are triggered.

At least one embodiment has at least one of the following advantages:

Enables network operators to obtain a normalized view of congestion status in their network.

Enables effective counter-measures (e.g. prioritization of traffic)

Enables mapping of complex congestion scenarios to a single scalar value for congested cells, enabling appropriate and configurable measures to improve service quality Enabling scalar value enables efficient transportation of congestion metric, e.g. in packet headers Applicable to any kind of shared link, including radio cells.

Many modifications and other embodiments of the invention set forth herein will come to mind to the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for providing congestion information in a network, performed in a memory available to a computing entity, the method comprising:
    obtaining a traffic bandwidth demand within a certain part of the network by evaluating an amount of traffic in the certain part of the network per time and for a certain type of service of a plurality of different types of services operating on the network;
    measuring actual traffic throughput within the certain part of the network; and
    calculating a congestion value representing a congestion level of a bottleneck connection link in the network, wherein the congestion value is a scalar and calculated based on a comparison between the measured actual traffic throughput and the traffic bandwidth demand within the certain part of said network.

2. The method according to claim 1, wherein the certain part of the network is at least one of the following: a cell, a link, a radio bearer, a handset, or a connection.

3. The method according to claim 1, wherein the traffic bandwidth demand is represented by a minimum bandwidth demand.

4. The method according to claim 3, wherein a congestion is detected based on the congestion value at a state in which the minimum bandwidth demand exceeds the measured actual traffic throughput per time over a given time span.

5. The method according to claim 1, wherein user equipment information of user equipment in the network and/or connectivity information and/or traffic type information and/or queue level information is included into the calculation of the congestion value.

6. The method according to claim 1, wherein the congestion value is adapted via a transformation function, wherein the transformation function amends at least one of the following: a number of congestion levels, a steepness of a congestion level curve, or a shape of a congestion level curve.

7. The method according to claim 6, wherein the transformation function is based on at least one feedback profile configured by an operator.

8. The method according to claim 1, wherein the congestion value is an integer number.

9. The method according to claim 1, wherein the traffic bandwidth demand is determined based on a respective traffic bandwidth demand peculiar for each particular type of service and stored in a table in a database.

10. The method according to claim 1, wherein, for determining the traffic bandwidth demand, a type of the traffic is identified by at least one of the following: deep packet inspection, packet markings, or Quality of Service (QoS) Class Indicator.

11. The method according to claim 1, wherein the traffic bandwidth demand is computed based on a number of active connections.

12. The method according to claim 11, wherein a connection is determined to be active based on an amount of time the connection is active within a measurement interval exceeding a predetermined threshold.

13. The method according to claim 12, wherein the amount of time is either measured directly or estimated.

14. The method according to claim 13, wherein the amount of time is estimated by counting a number of transmitted packets and/or by a queue activity.

15. A system for providing congestion information in a network, the system comprising a computer including one or more processors, which alone or in combination, are configured to provide for execution of the following steps:

obtaining a traffic bandwidth demand within a certain part of the network by evaluating an amount of traffic in the certain part of the network per time and for a certain type of service of a plurality of different types of services operating on the network;

measuring actual traffic throughput within the certain part of the network; and calculating a congestion value representing a congestion level of a bottleneck connection link in the network, wherein the congestion value is calculated based on a comparison between the measured actual traffic throughput and the traffic bandwidth demand within the certain part of said network.

16. The system according to claim 15, wherein the network is a radio access network.

17. The method according to claim 1, wherein the network is a radio access network.

18. The method according to claim 1, further comprising enacting counter measures in the network based on the congestion value.

19. The method according to claim 1, wherein the calculating a congestion value includes calculating multiple congestion values, wherein each of the multiple congestion values is a scalar and is calculated based on a comparison between the measured actual traffic throughput and traffic bandwidth demand within the certain part of the network for an individual application flow, wherein the calculated congestion values differ for respective concurrent application flows depending on the application type and/or application characteristics and/or network characteristics.

* * * * *